United States Patent
Lovett

(10) Patent No.: US 11,772,532 B1
(45) Date of Patent: Oct. 3, 2023

(54) MULTI LAYER SEAT WITH INSERTS

(71) Applicant: Myron Lovett, Chattanooga, TN (US)

(72) Inventor: Myron Lovett, Chattanooga, TN (US)

( * ) Notice: Subject to any disclaimer, the term of this patent is extended or adjusted under 35 U.S.C. 154(b) by 0 days.

(21) Appl. No.: 17/849,239

(22) Filed: Jun. 24, 2022

(51) Int. Cl.
| | |
|---|---|
| *B60N 2/52* | (2006.01) |
| *B60N 2/50* | (2006.01) |
| *B60N 2/64* | (2006.01) |
| *B60N 2/66* | (2006.01) |

(52) U.S. Cl.
CPC .............. *B60N 2/527* (2013.01); *B60N 2/504* (2013.01); *B60N 2/643* (2013.01); *B60N 2/646* (2013.01); *B60N 2/66* (2013.01)

(58) Field of Classification Search
CPC ........ B60N 2/527; B60N 2/504; B60N 2/646; B60N 2/643; B60N 2/66
USPC ................................................ 297/452.41
See application file for complete search history.

(56) References Cited

U.S. PATENT DOCUMENTS

| | | | | |
|---|---|---|---|---|
| 5,303,977 | A | * | 4/1994 | Sereboff .................. A47C 4/54 |
| | | | | 297/284.6 |
| 5,487,197 | A | * | 1/1996 | Iskra, Jr. ................ A47C 7/021 |
| | | | | 297/452.41 |
| 6,179,383 | B1 | * | 1/2001 | Ochi ........................ A47C 4/54 |
| | | | | 297/452.41 |
| 6,598,251 | B2 | | 7/2003 | Habboub et al. |
| 7,996,940 | B1 | * | 8/2011 | Dahm .................. A47C 27/082 |
| | | | | 297/452.41 |
| 9,676,310 | B2 | | 6/2017 | Fitzpatrick et al. |

FOREIGN PATENT DOCUMENTS

| | | | | | |
|---|---|---|---|---|---|
| CN | | 109130982 | A | * 1/2019 | |
| CN | | 112937737 | A | * 6/2021 | ................ B62J 1/28 |
| WO | WO-2012106754 | A1 | * 8/2012 | ............. A47C 7/425 |

\* cited by examiner

*Primary Examiner* — Milton Nelson, Jr.
(74) *Attorney, Agent, or Firm* — SANCHELIMA & ASSOCIATES, P.A.; Christian Sanchelima; Jesus Sanchelima

(57) ABSTRACT

A vehicle seat including a seat assembly and an insert assembly. The seat assembly having a seat base portion, a backrest portion. The insert assembly includes upper inserts, lower inserts, and a lumbar cushion. The upper inserts are filled with a combination of a silicone anti-freezing solution and small extruded polystyrene packing balls. The lower inserts are filled with jelly. The upper and lower inserts are mounted within the seat base portion and backrest portion. The lumbar cushion is mounted inside the backrest portion. The conjunction of the lower insert, upper insert and lumbar cushion are configured to bring maximum comfort to a user. The upper inserts, lower inserts and lumbar cushion are configured to bring a user an exceptional stability and support without pressure applied to a tailbone.

17 Claims, 3 Drawing Sheets

MULTI LAYER SEAT WITH INSERTS

BACKGROUND OF THE INVENTION

1. Field of the Invention

The present invention relates to a vehicle seat and, more particularly, to a vehicle seat that includes inserts of two layers, a top layer filled with gel plus expanded polystyrene beads and a bottom layer filled with jelly, placed from a seat base all the way up throughout the back rest of a vehicle seat to provide comfort to a user without losing form and function over time.

2. Description of the Related Art

Several designs for vehicle seats having gel cushioning have been designed in the past. None of them, however, include inserts of two layers enclosed by the outer cloth of a vehicle seat, from a seat base all the way up throughout the back rest of a vehicle seat for comfort on long-haul driving trips.

Applicant believes that a related reference corresponds to U.S. Pat. No. 6,598,251 issued to for a seat cushion for vehicles having a gel layer. Applicant believes that another related reference corresponds to U.S. Pat. No. 9,676,310 issued to for a vehicle seat having an elastic gel component. However, they differ from the present invention because they don't have inserts comprising a top layer of gel and expanded polystyrene balls, and a lower bottom layer of jelly to provide maximum comfort without losing form and function over time.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a vehicle seat that help to relieve stress, pressure and pain while traveling long distances.

It is another object of this invention to provide a seat vehicle that includes a lumbar cushion to decrease lumbar strain.

It is still another object of the present invention to provide a vehicle seat vehicle that reduces pressure on the tailbone and promotes healthy posture of the user.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

Figure 1:
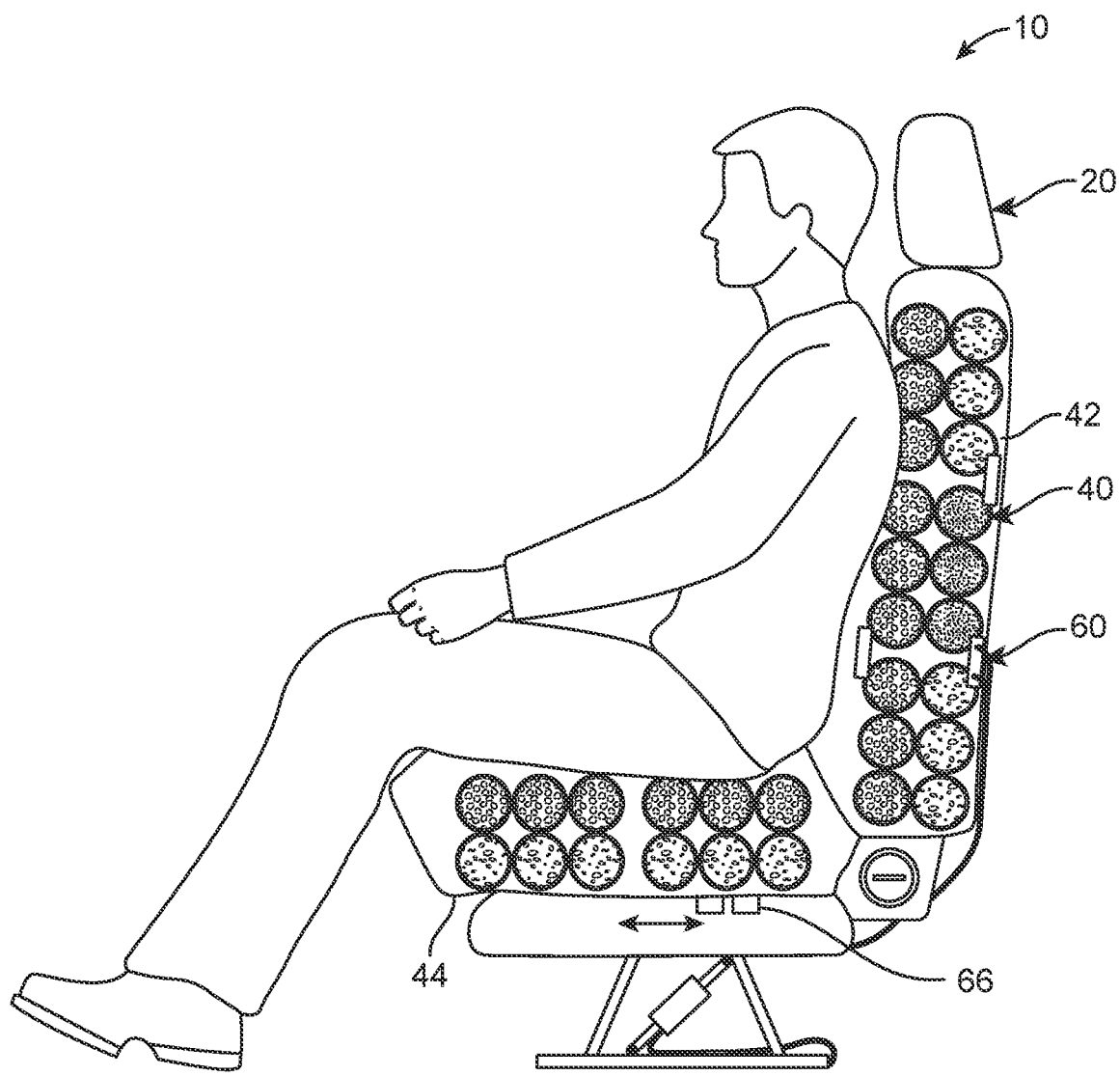

With the above and other related objects in view, the invention consists in the details of construction and combination of parts as will be more fully understood from the following description, when read in conjunction with the accompanying drawings in which:

FIG. 1 represents a cross-sectional view of a user seated in the present invention 10, showing the seat assembly 20 housing the insert assembly 40 and the actuation assembly 60.

Figure 2:
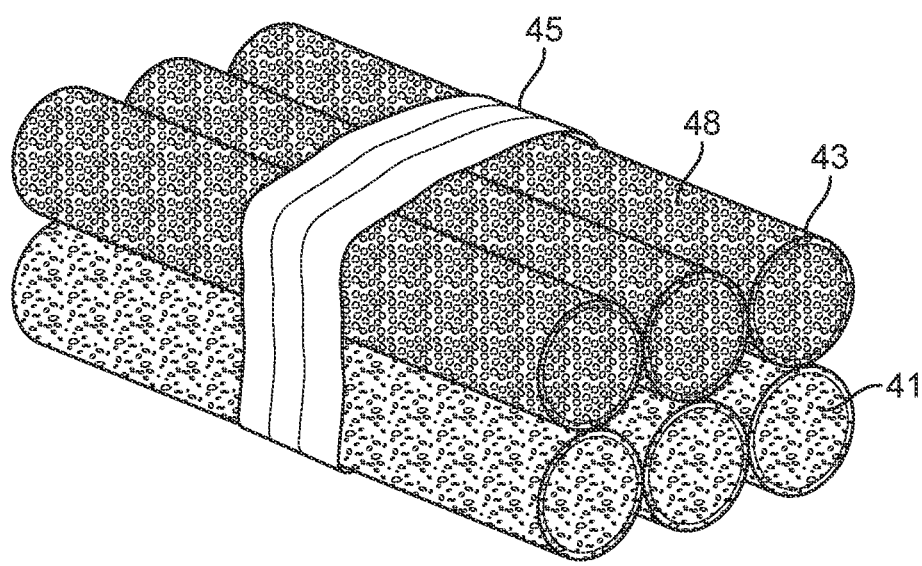

FIG. 2 shows an isometric view of the insert assembly 40, showing upper inserts 48 are filled with a combination of a silicone anti-freezing solution and small extruded polystyrene packing balls and expanded polystyrene balls. The upper inserts 48 are sealed with a rubber bladder 43. Lower inserts 41 are filled with jelly and is sealed with the rubber bladder 43. Upper inserts 48 and the lower inserts 41 are put together with a band 45.

Figure 3:
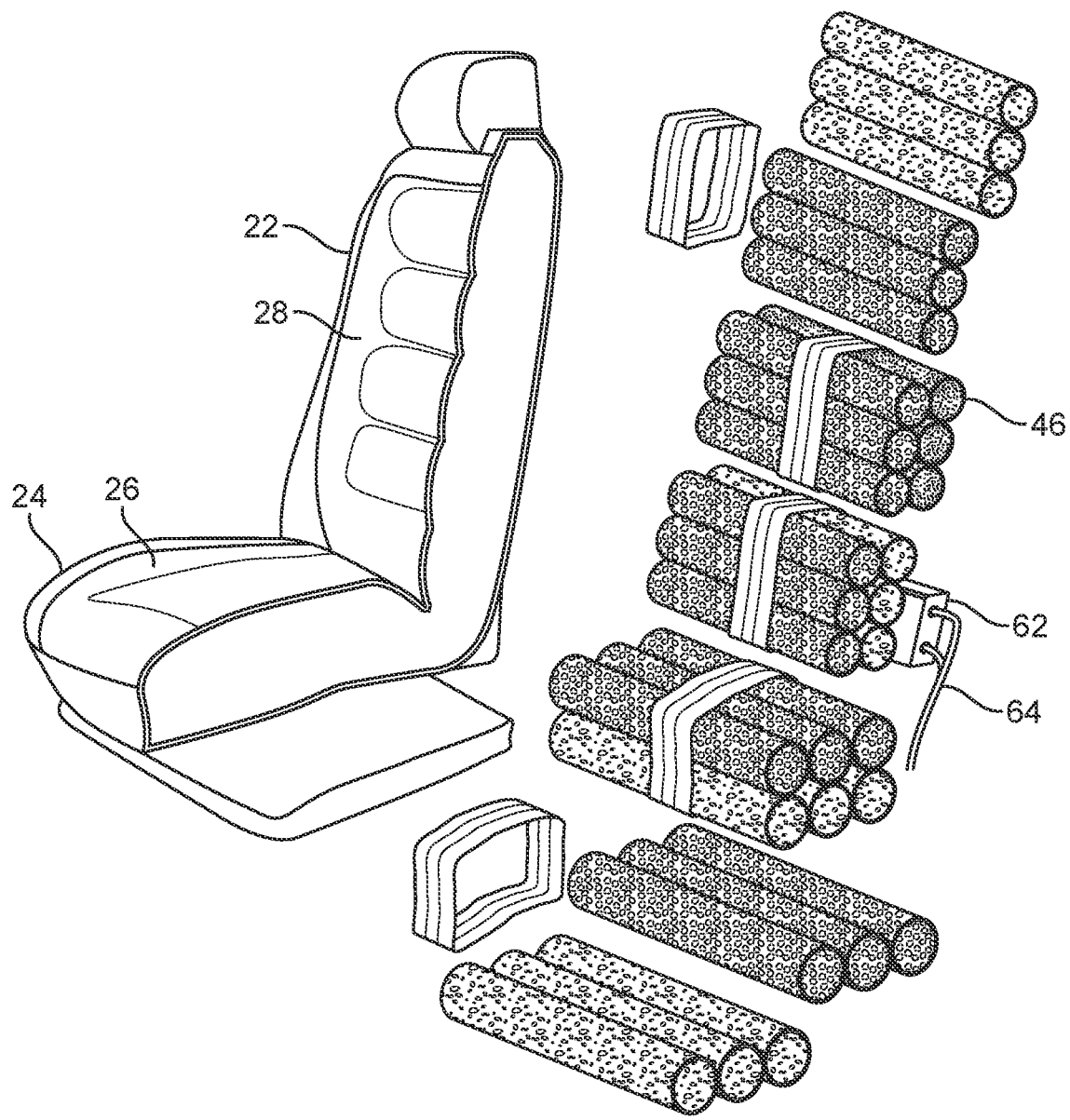

FIG. 3 illustrates an exploded view of the present invention 10 wherein is shown a backrest portion 22, a seat base portion 24, a seat base trim cover and a backrest trim cover, all these elements enclose a lumbar cushion 46, upper inserts 48 and lower insert 41s. It is also depicted de disposition of the insert assembly inside the seat assembly 20.

DETAILED DESCRIPTION OF THE EMBODIMENTS OF THE INVENTION

Referring now to the drawings, where the present invention is generally referred to with numeral 10, it can be observed that it basically includes a seat assembly 20, an insert assembly 40, and an actuation assembly 60. It should be understood there are modifications and variations of the invention that are too numerous to be listed but that are all fit within the scope of the invention. Also, singular words should be read as plural and vice versa and masculine as feminine and vice versa, where appropriate, and alternative embodiments do not necessarily imply that the two are mutually exclusive.

The seat assembly 20 includes a backrest portion 22, a seat base portion 24, a seat base trim cover 26, a backrest trim cover 28. A preferable embodiment for the seat assembly 20 may be a driver seat of a truck, nonetheless, a variety of embodiments may be suitable for the seat assembly 20, such as a driver seat of a car, chairs for personal usage, or any variation thereof. As shown in FIG. 1, the backrest portion 22 may be contoured to hold one user. A suitable embodiment for the backrest portion 22 may be one having curved sides to partially enclose and support the body of the user. A preferable embodiment of the backrest portion 22 may be one that supports the natural 's' shape of the spine. Other embodiment for the backrest portion 22 may be one having a bench shape, that may be a flat platform design to seat up to three people to sit abreast. The backrest portion 22 may be adjustable for greater tailored positioning for the user. The backrest trim cover 28 may be made nylon, polyester, cloth, or any variation thereof. The backrest trim cover 28 may have a layer of memory foam, orthopedic foam, open-cell form, or any variation thereof, in its internal side. The backrest trim cover 28 may be used for enveloping the insert assembly 40. The seat base portion 24 may have a substantially quadrangular shape with rounded corners and curved sides to support the body of the user. The seat base trim cover 26 may be made of nylon, polyester, cloth, or any variation thereof. The seat base trim cover 28 may have a layer of memory foam, orthopedic foam, open-cell form, or any variation thereof, in its internal side. The seat base trim cover 26 may be used to cover the insert assembly 40.

The insert assembly 40 includes a backrest cushion 42, a seat base cushion 44, lumbar cushion 46, upper insert 48, a lower insert 41, a bladder 43 and a band 45. The backrest cushion 42 may fill partially the interior of the backrest portion 22 as depicted in FIG. 1. A preferable embodiment of the backrest cushion 42 may be made of memory foam, nevertheless, other material may be used such as polyurethane foam, open-cell foam, lux foam, orthopedic foam, or any variation thereof. The backrest cushion 42 may be used for shaping the backrest portion 22. The seat base cushion 44 may fill partially the interior of the seat base portion 24 as depicted in FIG. 1. A preferable embodiment of the seat base cushion 44 may be made of memory foam, nevertheless, other material may be used such as polyurethane foam, open-cell foam, lux foam, orthopedic foam, or any variation thereof. The seat base cushion 44 may be used for shaping the base seat portion 24. In a suitable embodiment, the lumbar cushion 46 may be formed of cylindrical elements to provide an ergonomic cushion. Other embodiments for the lumbar cushion 46 may have a shape that fits the user back outline. The lumbar cushion 46 may be located inside the backrest portion 22. A suitable embodiment for the lumbar cushion 46 may be located just below the middle part of the backrest portion 22 as depicted in FIG. 1. The lumbar cushion 46 may be made of orthopedic foam, memory foam, or any variation thereof. Other embodiment of the lumbar cushion 46 may suggest the usage of a lumbar air bag. The lumbar cushion 46 may help to ease back pain and may allow the spine to remain in a natural position. The lumbar cushion 46 may also provide extra lumbar support to the user lower back in order to decrease lumbar strain. Each of the upper inserts 48 may have a cylindrical shape. In other embodiments each of the upper inserts 48 may have a prism shape, a cube shape, an ellipsoid shape, asymmetrical shape, or any variation of the aforesaid shapes. Each of the upper insert 48 may be sealed with the bladder 43. The bladder 43 may be made of rubber, latex, butyl, or any variation thereof. Each of the upper inserts 48 may be filled with a combination of a silicone anti-freezing solution and small extruded polystyrene packing balls. In a suitable embodiment, each of the upper inserts 48 may be a filled with 70% of packing balls and 30% of silicone anti-freezing solution, nonetheless, this percentages may vary depending on what the user may find more comfortable. Each of the upper insert 48 may be located inside the seat base portion 24 proximal to the seat base trim cover 26. The seat base portion 24 may have the internal space to house a variety of upper inserts 48, depending on the size of the seat base 24 and the size of each of the upper inserts 48. As shown in FIG. 1, the seat base may house at least two sets of upper inserts 48 set in a horizontal disposition. Each of the upper inserts 48 may be located inside the backrest portion 22 proximal to the backrest trim cover 28. The backrest portion may have the internal space to house a variety of upper inserts 48. As depicted in FIG. 1 there may be at least three upper inserts 48 located inside the backrest portion 22 in a vertical disposition. Nonetheless, the number of upper inserts 48 may vary depending on the size of the seat that houses them. Each of the lower inserts 41 may have a cylindrical shape. In other embodiments, each of the lower inserts 41 may have a cuboid shape, a cube shape, an ellipsoid shape, asymmetrical shape, or any variation of the aforesaid shapes. Each of the lower inserts 41 may be sealed the bladder 43. The bladder 43 may be made of rubber, latex, butyl, or any variation thereof. The lower inserts 41 may be filled with jelly. In another embodiment, the lower inserts 41 may be filled with gel. The lower inserts 41 may be located inside the seat base portion 24 and may be covered with the seat base trim cover 26. The seat base portion 24 may have the internal space to house a variety of lower inserts 41, depending on the size of the seat base 24 and the size of each of the lower inserts 41. The lower inserts 41 may be located underneath and in abutting contact with the upper inserts 48 As shown in FIG. 1 the seat base portion 24 may house at least two sets of lower inserts 41 set in a horizontal arrangement. Nonetheless, the number of upper inserts 48 may vary depending on the size of the seat that houses them. The backrest portion may have the internal space to house a variety of lower inserts 41. As depicted in FIG. 1 there may be two lower inserts 41 located inside the backrest portion 22 placed in a vertical disposition. Nonetheless, the number of upper inserts 48 may vary depending on the size of the seat that houses them. The band 45 may be made of a flexible material such as synthetic rubber, natural rubber, or any variation of the aforesaid materials. The band 45 may be used to put together the upper inserts 48 and the lower inserts 41 to create sets thereof as shown in FIG. 2. The conjunction of the upper insert 48 and the lower insert 41 may provide optimal comfort and support for the user.

The actuation assembly 60 may include a lumbar mechanism 62, lines 64, and buttons 66. The actuation assembly 60 may be housed by the seat assembly 20. The actuation assembly 60 may permit a user to adjust the settings of the seat assembly 20 to provide optimal comfort. In a suitable embodiment, the buttons 66 may be located on a lateral side of the seat base portion 24. In other embodiment, the buttons may be disposed on any other known location as known in the art that permits to reach the buttons easily. The buttons 66 may be operatively connected to the lumbar mechanism 62 to perform predetermined actions. In a suitable embodiment, the lumbar mechanism 62 may require a fluid to be actuated, the liquid may be transported through the lines 64. The fluid may be liquid or gas. The lumbar mechanism 62 may be flush with the lumbar cushion 46. The lumbar mechanism 62 operatively working with the lumbar cushion 46 may be height and depth adjustable, additionally may define an ergonomic portion for users. The lumbar mechanism 46 may be any suitable mechanism as known in the art to provide an adjustable support for the lumbar zone such as the ones used in vehicle seats, and/or the like.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A vehicle seat, comprising:
   a. a seat assembly, wherein said assembly includes a backrest portion, and a seat base portion; and
   b. an insert assembly, wherein said insert assembly includes a lumbar cushion, upper inserts and lower inserts, each of said upper inserts is filled with a combination of a silicone anti-freezing solution and small extruded polystyrene packing balls, each of said lower inserts is filled with jelly, said insert assembly is configured to replace a traditional seat cushion insert, said insert assembly is mounted inside said seat assembly, said insert assembly is configured to enhance comfort of a user when driving.

2. The vehicle seat of claim 1, wherein said seat assembly includes a seat base trim cover and a backrest trim cover.

3. The vehicle seat of claim 1, wherein said upper insert is filled with 70% of packing balls and 30% of silicone anti-freezing solution.

4. The vehicle seat of claim 1, wherein said insert assembly further includes a backrest cushion and a seat base cushion.

5. The vehicle seat of claim 4, wherein said seat base cushion and said backrest cushion are mounted inside said seat base trim cover and said backrest trim cover accordingly.

6. The vehicle seat of claim 4, wherein said seat base cushion and said backrest cushion are configured to shape said seat base portion and said backrest portion accordingly.

7. The vehicle seat of claim 4, wherein said backrest cushion and said seat base cushion is made of memory foam.

8. The vehicle seat of claim 1, wherein said insert assembly further comprises a bladder.

9. The vehicle seat of claim 8, wherein said bladder is used to seal each of said upper inserts and each of said lower inserts.

10. The vehicle seat of claim 1, wherein said insert assembly includes a band.

11. The vehicle seat of claim 10, wherein said band is configured to attach said upper inserts and said lower inserts to create sets thereof.

12. The vehicle seat of claim 1, wherein each of the upper inserts has a cylindrical shape.

13. The vehicle seat of claim 1, wherein each of the lower inserts has a cylindrical shape.

14. The vehicle seat of claim 1 further including an actuation assembly having a lumbar mechanism, lines and buttons, wherein the actuation assembly is configured to adjust the lumbar cushion.

15. A vehicle seat, consisting of:
  a. a seat assembly, wherein said seat assembly includes a backrest portion, a seat base portion, a seat base trim cover, and a backrest trim cover; and
  b. an insert assembly, wherein said insert assembly includes a backrest cushion, a seat base cushion, upper inserts, lower inserts, a lumbar cushion, a bladder, and a band, said backrest cushion is made of memory foam, said seat base cushion is made of memory foam, said backrest cushion is configured to shape said backrest portion, said seat base cushion is configured to shape said seat base portion, said upper inserts are filled with a combination of a silicone anti-freezing solution and small extruded polystyrene packing balls, said upper inserts are filled with 70% of packing balls and 30% of silicone anti-freezing solution, said lower inserts is filled with jelly, said upper inserts are sealed with said bladder, said lower inserts are sealed with said bladder, said upper inserts and said lower inserts are attached by means of said band to create sets thereof, said upper inserts and said lower inserts are mounted inside said seat base portion and said backrest portion, said lumbar cushion is located inside backrest portion proximal to a lumbar zone thereof.

16. A vehicle seat, comprising:
  a. a seat assembly, wherein said seat assembly includes a backrest portion, a seat base portion, a seat base trim cover, and a backrest trim cover; and
  b. an insert assembly, wherein said insert assembly includes a backrest cushion, a seat base cushion, upper inserts, lower inserts, a lumbar cushion, a bladder and a band, said backrest cushion is made of memory foam, said backrest cushion is used for shaping said backrest portion, said seat base cushion is made of memory foam, said seat base cushion is used for shaping said seat base portion, each of said upper inserts is filled with a combination of a silicone anti-freezing solution and small extruded polystyrene packing balls, each of said upper inserts is sealed with said bladder, said lower inserts are filled with jelly, said lower inserts are sealed with said bladder, said upper inserts and said lower inserts are attached by means of said band to create sets thereof, said upper inserts and said lower inserts are mounted inside said seat base portion, said upper inserts, said lower inserts and said lumbar cushion are mounted inside said backrest portion, said insert assembly is configured to reduce pressure on a tailbone and promote healthy posture of a user.

17. The vehicle seat of claim 16 further includes an actuation assembly including a lumbar mechanism, lines, and buttons, said actuation assembly is housed by the seat assembly, the lumbar mechanism is operatively connected to the lines and the buttons, the lumbar mechanism may be in abutting contact with the lumbar cushion, the actuation mechanism is configured to adjust in height and depth said lumbar cushion.

\* \* \* \* \*